Patented Aug. 11, 1942

2,292,431

UNITED STATES PATENT OFFICE 2,292,431

RICE CANNING PROCESS

Nicholas C. Coan, San Jose, Calif.

No Drawing. Application October 27, 1941,
Serial No. 416,687

3 Claims. (Cl. 99—186)

This invention relates to a process for the cooking and canning of rice to the end that cooked rice can be successfully marketed in cans.

In my Patent 2,161,119, issued June 6, 1939, I disclosed a successful rice cooking and canning operation. Rice processed according to the disclosure of my patent was packed and marketed successfully on a commercial scale. However, after the rice had been on the market for quite some time, complaints arose from buyers that repeat consumers' orders for the rice were not being received. Upon investigation, it was found that the lack of repeat orders was attributable to the fact that when the canned rice was opened it could be removed from the can only with difficulty. Further, upon removal, the rice was enclosed within an outer shell of hard, dry, rice kernels. This outer shell had all the appearance of uncooked rice while the inner portion, particularly in the center, was moist, non-starchy and of a palatable taste and appearance, with each grain easily separating from the others. Apparently the moisture in the rice passed inwardly to the center of the rice in the can to leave an outer layer or skin of hard rice having the appearance of uncooked rice.

In accordance with this invention I have found that the partially cooked rice, prior to placement in the can, should be enclosed, preferably entirely, in a moisture retaining material. The rice, when so wrapped, is placed in the can which is thereafter sealed and cooking of the rice completed. A suitable material is vegetable parchment, particularly that white vegetable parchment such as that sold by Paterson, Parchment Paper Co. under the trade-mark Patapar. Vegetable parchment has the advantage that it is tough and is therefore easily handled and packed. While I prefer to employ a vegetable parchment, other suitable materials, equivalent to vegetable parchment in its function within the can, can be employed.

The process of this invention and the rice package produced will be further understood upon considering the following detailed practice of the invention. The rice is preferably first partially cooked, excess starch removed, and the rice partially dried. To accomplish this the rice is subjected to the several steps related in my patent. For convenience these are repeated herewith.

"In practicing the invention, I take ordinary rice which has been suitably cleaned so that it is free of dirt, chaff and any other foreign matter. This rice is then subjected to the action of boiling water for a period long enough to soften the rice and heat it through to the center of each grain. Preferably this is done by placing the rice in boiling water and retaining it therein for a period of about 15 minutes, or until the rice becomes softened and heated through to its center. I have found it advantageous to replace the boiling water during the softening operation because this facilitates starch removal.

"This is conveniently accomplished by running a stream of water into the vessel during the softening operation.

"After the rice has been softened and partially cooked, it is washed to remove excess starch and other water soluble material. I have procured the best results by using hot water, 200° F. and above, since I have found that this gives the best results, although cold water can be employed.

"The partially softened, wet and washed rice is then dried to reduce the moisture content so that the rice contains approximately one half the total moisture which it is capable of taking up. Usually rice takes up water to about four times its initial weight. I have found that rice, treated as previously disclosed, when subjected to a temperature of 170° F. for about 10 minutes, under such conditions that moisture driven off from the rice is removed from contact therewith, is sufficiently dry. Preferably, the rice is handled in thin layers while being dried so that the rice is substantially uniformly treated."

Upon completion of the drying operation, the hot partially dehydrated rice is wrapped in the vegetable parchment and then placed in cans. These are immediately completely sealed while hot to ensure a reduced pressure in the cans when they are cooled. Thereafter the cans are further processed to complete the cooking operation and to ensure that the product therein is sterile. As is disclosed in my patent various times and temperatures can be employed. I have done this successfully by maintaining the cans at 225° F. for about 40 minutes, after which the cans are cooled.

The rice product, upon opening one of the cans after it has been standing in a warehouse or upon shelves in a market for a period of months, will be found to be non-starchy and of a palatable taste and appearance with each grain easily separating from the other, and with the moisture in the can uniformly distributed throughout the contents. Apparently the vegetable parchment wrapping material acts as a wick to distribute that moisture in the rice uniformly and to maintain it in this condition.

The various times and temperatures recited are by way of example only for considerable variation can be made in these by those skilled in the art. For example, the rice can be dried at 90° F., if desired, about 12 minutes then being required. The cans can be subject to other temperatures, for example 270° F., and for a longer time, 70 minutes, to ensure a more complete cook.

I claim:

1. A process for preparation of canned rice which comprises subjecting rice to preliminary cooking in boiling water for about 15 minutes, washing the rice with hot water to remove water soluble materials coating the rice, drying the washed rice in a dry atmosphere for about 10 minutes at about 170° F., to reduce the moisture content thereof to about one half of the total moisture which it is initially capable of taking up, wrapping the hot partially dried rice in vegetable parchment and placing the so wrapped rice in a can, sealing the can and cooking the rice in the sealed can to complete the cooking operation.

2. A process for preparation of canned rice which comprises subjecting the rice to preliminary cooking in boiling water for about 15 minutes and substantially continuously replacing the water with hot water during said cooking to wash the rice, drying the cooked and washed rice for about 10 minutes at about 170° F. in a substantially dry atmosphere with the rice spread out in sheet form to reduce the moisture content thereof to about one half of the total moisture which it is initially capable of taking up, wrapping the hot partially dried rice in vegetable parchment and placing the so wrapped rice in a can, and subjecting the sealed can for about 40 minutes to a temperature of about 225° F. to complete the cooking operation.

3. The process for preparation of canned rice which comprises partially cooking the rice and removing the water soluble materials coating the rice therefrom, partially drying the rice, packing the partially dried rice in a can with a sheet of vegetable parchment interposed between the rice and the can, sealing the can and thereafter cooking the rice in the sealed can to complete the cooking operation.

NICHOLAS C. COAN.